United States Patent [19]

Edstrom, Sr. et al.

[11] Patent Number: 5,655,797
[45] Date of Patent: Aug. 12, 1997

[54] SANITARY FITTING

[75] Inventors: William E. Edstrom, Sr., Waterford; Peter S. Planton, Muskego, both of Wis.

[73] Assignee: Edstrom Industries, Inc., Waterford, Wis.

[21] Appl. No.: 576,259

[22] Filed: Dec. 21, 1995

[51] Int. Cl.$^6$ ................................................. F16L 21/04
[52] U.S. Cl. .................... 285/342; 285/382.7; 285/354
[58] Field of Search ................................. 285/340, 342, 285/382.7, 354, 353

[56] References Cited

U.S. PATENT DOCUMENTS

| | | |
|---|---|---|
| 193,993 | 8/1877 | Pennie et al. |
| 2,158,757 | 6/1939 | Kuestermeier ................................. 235/196 |
| 2,251,717 | 8/1941 | Parker ................................. 285/382.7 X |
| 2,330,841 | 10/1943 | Parker ................................. 285/328 |
| 2,478,149 | 8/1949 | Wolfram et al. ................................. 285/382.7 X |
| 2,531,922 | 11/1950 | Seamark ................................. 285/193 |
| 2,644,700 | 7/1953 | Woodling ................................. 285/382.7 X |
| 2,670,223 | 2/1954 | Ream ................................. 285/193 |
| 2,757,943 | 8/1956 | Henderson ................................. 285/52 |
| 3,135,537 | 6/1964 | Scott ................................. 285/341 |
| 3,186,740 | 6/1965 | Lee ................................. 285/101 |
| 3,312,484 | 4/1967 | Davenport ................................. 285/340 |
| 3,468,566 | 9/1969 | Nietzel ................................. 285/341 |
| 3,485,517 | 12/1969 | Howe ................................. 285/382.7 X |
| 3,879,070 | 4/1975 | Russ ................................. 285/342 |
| 4,309,050 | 1/1982 | Legris ................................. 285/382.7 X |
| 4,516,794 | 5/1985 | Zorb et al. ................................. 285/30 |
| 4,635,975 | 1/1987 | Campbell ................................. 285/340 |
| 5,005,875 | 4/1991 | Harle ................................. 285/73 |
| 5,308,122 | 5/1994 | Crawford et al. ................................. 285/52 |

FOREIGN PATENT DOCUMENTS

| | | | |
|---|---|---|---|
| 3902648 | 8/1990 | Germany ................................. | 285/382.7 |
| 585105 | 1/1947 | United Kingdom ................................. | 285/342 |
| 617048 | 1/1949 | United Kingdom ................................. | 285/342 |
| 2113788 | 8/1983 | United Kingdom ................................. | 285/342 |

*Primary Examiner*—Terry Lee Melius
*Assistant Examiner*—Heather Shackleford
*Attorney, Agent, or Firm*—Nilles & Nilles

[57] ABSTRACT

A sanitary fitting provides a fluid-tight seal between the fitting and the axial end of the tube coupled to the fitting, thereby eliminating crevices between the end of the tube and the sealing point of the fitting and consequent fluid accumulation and potential bacteria growth. The fitting preferably includes a body having a recessed outer end, an elastomeric seal disposed in the recess in the body, a gripping ring slidable into a stepped notch formed in the outer end of the body, and a locking mechanism which grips the tube and which draws the tube into a position in which its end sealingly engages the seal and causes the seal to sealingly engage an annular shoulder of the body. The gripping ring, body, and tube interact to provide very high retention forces permitting the fitting to withstand fluid pressures on the order of several thousand psi.

20 Claims, 4 Drawing Sheets

SANITARY FITTING

BACKGROUND OF THE INVENTION

1. Field of the Invention

The invention relates to fittings and, more particularly, to fittings for connecting together sections of rigid metal tubes for conveying liquids under sanitary conditions.

2. Discussion of the Related Art

Fittings are well known for connecting together sections of metal pipes or tubes. Threaded fittings and compression fittings are the most commonly used for this purpose because they are relatively reliable and relatively inexpensive to fabricate and install.

Figure 1:
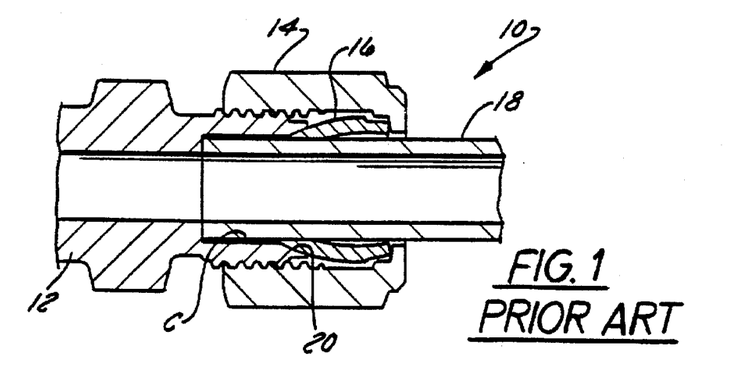
FIG. 1 is a sectional elevation view of a prior art compression fitting, appropriately labeled "Prior Art"

Referring to FIG. 1, a conventional swaglok-type compression fitting 10 includes a recessed body 12, a locking nut 14, and a gripping ring 16. The recessed body 12 receives the end of a tube 18, and the gripping ring 16 is disposed between the end of the body 12 and an outer flange of the nut 14. In use, as the nut 14 is threaded onto the body 12, fingers on the end of the gripping ring 16 are forced into a wedged-shaped end portion 20 of the body 12 so as to grip the tube 18 and to seal against both the tube 18 and against the end portion 20 of the body 12.

The fitting 10 exhibits several drawbacks and disadvantages rendering it poorly suited for use in systems requiring sanitary operating conditions. For instance, because the actual seal point between the gripping ring 16, the tube 18, and the body 12 is located remote from the end of the tube 18, a relatively large crevice C is present in the fitting. Fluids may collect in this crevice, promoting bacterial growth.

Threaded joints are considerably stronger than compression joints. However, voids are formed between the threads which are even larger than the crevices formed in compression fittings. Fluid accumulation and bacteria growth therefore are even more problematic in fittings having threaded joints than in those having compression joints.

Sanitary fittings are available which are designed to eliminate crevices in the vicinity of the end of the tube, but all previously known sanitary fittings exhibit certain drawbacks and disadvantages.

Figure 2:
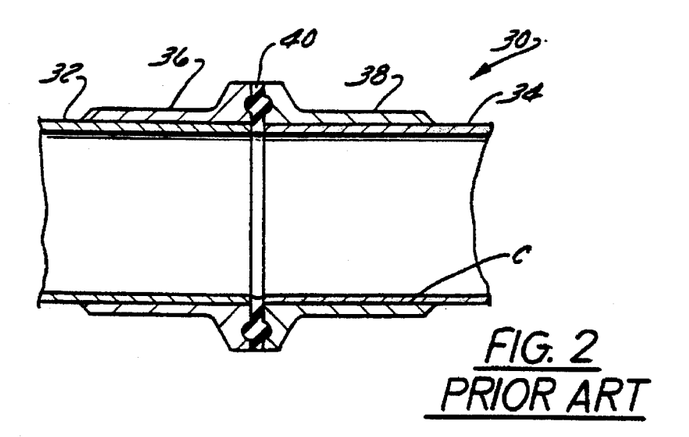
FIG. 2 is a sectional elevation view of a prior art role-on ferrule sanitary fitting, appropriately labeled "Prior Art"

Referring for instance to FIG. 2, one type of sanitary fitting 30 employs a "roll-on" ferrule as the sealing portion of the fitting. Specifically, tubes 32, 34 to be joined are expanded into grooves formed on the inner periphery of ferrules 36, 38 using rollers. A gasket 40 is placed between the ferrules 36, 38, and the ferrules 36, 38 are forced towards one another, using a clamp or threaded nut (not shown) to compress the gasket therebetween. When the fitting 30 is properly assembled, the ends of the tubes 32, 34 are sealed to the gasket 40 to eliminate voids or crevices between the tubes 32, 34 and the gasket 40 and to prevent fluid accumulation and bacteria growth.

The roll-on ferrule fitting 30 exhibits several drawbacks and disadvantages. For instance, it is relatively difficult to assemble because the ends of the tubes 32, 34 must be expanded into contact with the ferrules 36, 38 as part of the assembly process. Moreover, unless the gasket 40 is perfectly positioned to seal against the ends of the tubes 32, 34 rather than against the ends of the ferrules 36, 38, leakage can occur, particularly during temperature cycling, due to the formation of crevices C between the ferrules 36, 38 and the tubes 32, 34 as a result of temperature differentials between the ferrules and the tubes. Even if the crevices C do no extend across the axial length of the interface between the tube 32, 34 and the ferrules 36, 38, fluids still may accumulate in the crevices C, thereby leading to unsanitary conditions and promoting bacterial growth.

Figure 3:
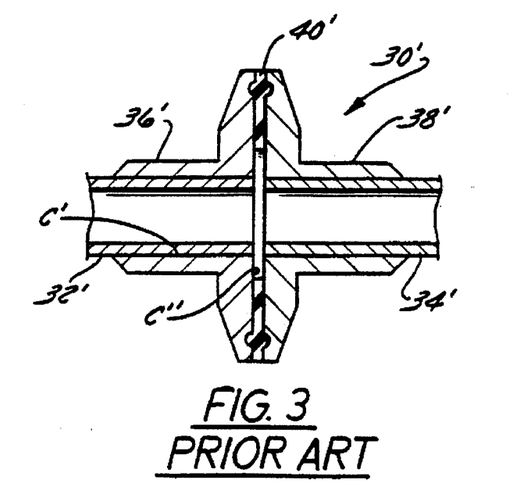
FIG. 3 is a sectional elevation view corresponding to FIG. 2 and illustrating the inability to use a sanitary fitting of the type illustrated in FIG. 2 with small diameter tubes.

Referring to FIG. 3, structural constraints prohibit the use of roll-on ferrule-type fittings 30' with tubes 32', 34' having a diameter below 1 inch OD because the gasket 40', required to provide proper alignment between the adjacent tubes 32' and 34', is not available below 1 inch in size. Accordingly, if one were to attempt to use this style of fitting with tubes of relatively small size, i.e., ½ inch, a major crevice C" is formed at the ferrule 36, 38 which promotes fluid accumulation and bacterial growth. Of course, the potential still exists for the formation of a crevice C' similar to the crevice C as discussed above in connection with FIG. 2 and the accompanying disadvantages.

While other sanitary fittings are known, some of which solve one or more of the problems discussed above, all are relatively expensive to manufacture, and many are not easily usable with cut lengths of standard tubing.

Another problem associated with many fittings is that they fail at relatively low pressures because the holding forces applied to the tubes are relatively weak. For instance, U.S. Pat. No. 2,158,757 to Kuestermier discloses a fitting in which the tube is held in place by a gripping ring. The gripping ring has an annular portion spaced from the tube and a plurality of identical finger portions sloping inwardly and downwardly to terminate closely adjacent the outer wall of the tube. The fingers grip the tube when the fitting is assembled and locked in place, thereby preventing movement of the tube relative to the fitting. However, the combined area of the fingers is somewhat smaller than the combined area of the gaps between the fingers, and only the tips of the fingers grip the tube. Accordingly, very high stresses are imposed on these fingers, even at relatively low pressures. When the pressure in the tube exceeds a relatively low threshold, the fingers will buckle or bend back over themselves and allow the tube to be forced out of the fitting under fluid pressure therein. Experiments and manufacturers' specifications have revealed that most fittings of this type fail at pressures on the order of 200–500 psi.

OBJECTS AND SUMMARY OF THE INVENTION

A primary object of the invention is to provide a sanitary fitting providing a fluid-tight seal between the fitting and a cut length of metal tube connected to the fitting, thereby preventing the formation of any voids or crevices in the fitting and inhibiting bacterial growth.

A secondary object of the invention is to provide a sanitary fitting which has the characteristics described above and which can be used with virtually any size tube.

Another secondary object of the invention is to provide a sanitary fitting which has one or more of the characteristics described above and which is relatively easy and inexpensive to fabricate and which is easy to install.

In accordance with a first aspect of the invention, this object is achieved by providing a sanitary fitting which includes a tubular body, an L-shaped elastomeric seal, and a locking mechanism. The body has an outer axial end portion, the end portion having an inner radial peripheral surface which has a recess formed therein to present an annular shoulder. The seal is disposed in the recess in the end portion of the body and has an inwardly-projecting annular flange, the flange having inner and outer axial surfaces and having an inner radial peripheral surface. The inner axial surface of the flange sealingly engages the shoulder of the body, and the outer axial surface of the flange is sealingly engageable with the axial end of the tube. The locking mechanism includes a gripping device and a retaining device. The gripping device surrounds the tube, grips the outer radial peripheral surface of the tube, and draws the axial end of the tube into sealing engagement with the outer axial surface of the annular flange of the seal. A retaining device surrounds the tube, the gripping device, and the body and locks the tube, the gripping device, and the body in position.

Preferably, the body and the seal are dimensioned and configured such that the inner radial peripheral surface of the body, the inner radial peripheral surface of the flange of the seal, and the inner radial peripheral surface of the tube present a generally contiguous cylindrical surface lacking any crevices where fluids may accumulate.

Yet another secondary object of the invention is to provide a sanitary fitting which has one or more of the characteristics described above and which is capable of withstanding significantly higher internal pressures than standard compression fittings of the same size.

In accordance with another aspect of the invention, the gripping device preferably includes a gripping ring. The gripping ring has a generally cylindrical portion which is disposed radially between the body and the tube and which grips the tube and draws the tube into sealing engagement .with the outer axial surface of the annular flange of the seal. The generally cylindrical portion a) has inner and outer axial ends, b) has a plurality of notches formed therein which extend from the inner axial end toward the outer axial end, and c) engages the outer radial peripheral surface of the tube along substantially the entire axial length of the generally cylindrical portion. An annular flange extends generally radially outwardly from the generally cylindrical portion and has an inner axial end surface which engages the body.

Preferably, in order to maximize the gripping forces imposed by the gripping ring, the notches in the generally cylindrical portion of the gripping ring have a combined surface area which is relatively small when compared to a surface area of the remainder of the generally cylindrical portion.

Another primary object of the invention is to provide an improved method of coupling a tube to a fitting while inhibiting fluid accumulation and consequent bacterial growth within the fitting.

In accordance with yet another aspect of the invention, this object is achieved by first providing a tubular body, an elastomeric seal, and a metal tube. The body has an outer axial end portion, an outer radial peripheral surface of the end portion being threaded and an inner radial peripheral surface of the end portion presenting an annular shoulder. The seal has an outer axial end surface and an inner axial end surface. The tube has an axial end. Next, a gripping ring and a nut are slid over the axial end of the tube, the nut having a threaded inner radial peripheral surface. Subsequent steps include 1) positioning the tube, the gripping ring, and the nut such that the axial end of the tube and at least a portion of the gripping ring are surrounded by the outer axial end portion of the body and such that the nut engages the body, and then 2) threading the nut onto the body such that the nut moves axially with respect to the body and forces the gripping ring to move axially with respect to the body. The gripping ring grips the tube such that, during at least a portion of the threading step, the gripping ring draws the tube into a position in which the elastomeric seal is clamped between the axial end of the tube and the annular shoulder of the body and in which the inner axial surface of the seal sealingly engages the shoulder of the body and the outer axial surface of the seal sealingly engages the axial end of the tube.

Other objects, features, and advantages of the invention will become more readily apparent to those skilled in the art from the detailed description and the accompanying drawings. It should be understood, however, that the detailed description and the specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF A PREFERRED EMBODIMENT

1. Resume

Pursuant to the invention, a sanitary fitting is provided which 1) is relatively simple and inexpensive to fabricate and which is easy to assemble, 2) can withstand internal fluid pressures on the order of several thousand psi, and 3) provides a fluid-tight seal between the fitting and the axial end of the tube coupled to the fitting, thereby eliminating crevices between the end of the tube and the sealing point of the fitting and consequent fluid accumulation and potential bacteria growth. The fitting preferably includes a body having a recessed outer end, an L-shaped elastomeric seal disposed in the recess in the body, a gripping ring slidable into a stepped notch formed in the outer end of the body, and a locking mechanism which grips the tube and which draws the tube into a position in which it sealingly engages the annular flange forming the lower leg of the seal and causes the annular flange to seal against an annular shoulder of the body. The inner radial peripheral surface of the body, the inner radial peripheral surface of the seal flange, and the inner radial peripheral surface of the tube present a generally contiguous cylindrical surface lacking any crevices where fluid may accumulate. Moreover, the gripping ring, body, and tube interact to provide very high retention forces permitting the fitting to withstand fluid pressures on the order of several thousand psi.

2. System Overview And Fitting Construction

The inventive sanitary fitting 100 could be used in virtually any tubing or piping system designed for the conveyance of liquids and is especially useful in systems conveying liquids subject to contamination by microbe or bacterial growth within pockets of liquids trapped in crevices or voids in the piping system. The versatility of the fitting's design is heightened by the fact that it is applicable to tubes or pipes ranging in diameter from ¼ inch or less to a diameter of several inches. In the illustrated embodiment, the inventive fitting 100 is used in a laboratory animal watering system 102 conveying distilled or otherwise purified drinking water to mice, rats, or other laboratory animals. The use of sanitary fittings is important in this type of system, not only because the animals' health may be adversely affected by microbe or bacterial growth within the watering system, but also because sickness resulting from the presence of bacteria or other microbes in such water may skew or even ruin the results of years of research. The system 102, used for instance to convey water to and/or within in a standard cage and rack system, includes several sections of tubes 104, 104' and a plurality of animal watering valves 106 (a separate valve 106 being provided for each cage on the rack.) Pursuant to the invention, the tubes 104, 104' are connected to one another and/or to the valves 106 by fittings 100, 100'. Two of the fittings 100, 100' are illustrated in a T-union 108, which also presents a nipple for the valve 106, it being understood that the fittings of the same design could and would be used in elbows, simple unions, and as all other fittings in the system in which a tube is joined with another tube and/or with a valve and/or hoses or other components of the system 102. The tubing system of the illustrated system is ½ O.D. rolled stainless steel tubing, it being understood that the fitting 100 could be used with virtually any tube of diameters considerably smaller or larger than that of the illustrated tubes 104, 104'. Since each of the fittings 100, 100' is identical in construction and operation, only the fitting 100 will be detailed.

Referring now to FIGS. 4, 5, 8, and 9, the sanitary fitting 100 receives and seals against an axial end 112 of the tube 104. The fitting 100 includes a tubular body 114, an elastomeric seal 116, and a locking mechanism 117. In the illustrated and preferred embodiment, the locking mechanism 117 includes a ferrule or gripping ring 118 and a hex nut 120. When the fitting 100 is in the assembled position illustrated in FIGS. 4 and 9, the gripping ring 118 engages the outer peripheral surface of the tube 104 and holds the tube 104 in a position in which the end 112 of the tube 104 is sealed against the elastomeric seal 116 and in which the elastomeric seal 116 is sealed against the body 114 without any voids or crevices being formed between the seal 116 and the tube 104 or between the seal 116 and the body 114, thereby preventing accumulation of fluids in the fitting 100 and consequent bacterial growth. Each of the major components of the fitting 100 will now be detailed.

The tubular body 114 is formed from a single stainless steel element which has an outer axial end portion 122 for cooperation with the mating components of the fitting 100. A recess 124 is formed in the inner radial peripheral surface of end portion 122, with the inner axial end of the recess 124 presenting an annular shoulder 126. A stepped notch 128 is formed in the outer axial end of end portion 122 and is wider in cross section at an axial outer end thereof than at an axial inner end thereof. (It should be understood that "stepped" as used herein does not require a discrete step, but could include a wedge-shape.) A radial flange 130 projects inwardly from the inner radial peripheral surface of the body 114 so as to define an outer axial end of the recess 124 and an inner axial end of the stepped notch 128. The outer peripheral surface of the inner end portion 122 of the body 114 is threaded for reasons that will become apparent below.

The purpose of the elastomeric seal 116 is to provide a fluid-tight seal to both the shoulder 126 of the body 114 and the end 112 of the tube 104 while preventing fluid accumulation and consequent microbe or bacterial growth in the fitting 100. Preferably, the seal 116 is also designed to be firmly maintained in the body 114 during assembly and to provide secondary seals both against the inner radial peripheral surface of the body 114 and the outer radial peripheral surface of the tube 104. This seal 116 is also preferably designed so as to provide the desired seal at the axial end 112 of the tube 104 without requiring precise machining of the tube.

Towards these ends, the seal 116 comprises an L-shaped tubular silicon rubber element which has an axial leg 132 and a radial leg 134 and which is dimensioned to fit snugly in the recess 124 in the body 114. The axial leg 132 of the seal 116 is significantly longer than the radial leg 134 and, in the assembled condition of the fitting 100 illustrated in FIGS. 4 and 9, seals against the inner peripheral surface of the body 114 and the outer peripheral surface of the tube 104. The radial leg 134 is formed from an inwardly projecting annular flange of the seal 116 and is of generally rectangular cross-section along substantially its entire radial length. An inner axial surface of the leg or flange 134 sealingly engages the shoulder 126 of the body 114, and an outer axial surface of the leg or flange 134 sealingly engages the axial end 112 of the tube 104. As is clearly illustrated in the drawings, the outer axial end of the generally cylindrical or axial leg portion 134 is spaced from the flange 130 so as to remain uncompressed upon fitting assembly. The radial length of the radial leg or flange 134 should be at least as great as the thickness of the tube 104 so that no crevice is formed between the tube 104 and the end of the flange 134. However, the leg or flange 134 preferably should not be significantly longer than the thickness of the tube 104 so that, in use, the inner radial peripheral surfaces of the body 114, flange 134, and tube 104 present a generally continuous cylindrical surface lacking any crevices where fluids may accumulate.

Figures 4, 6, 7:
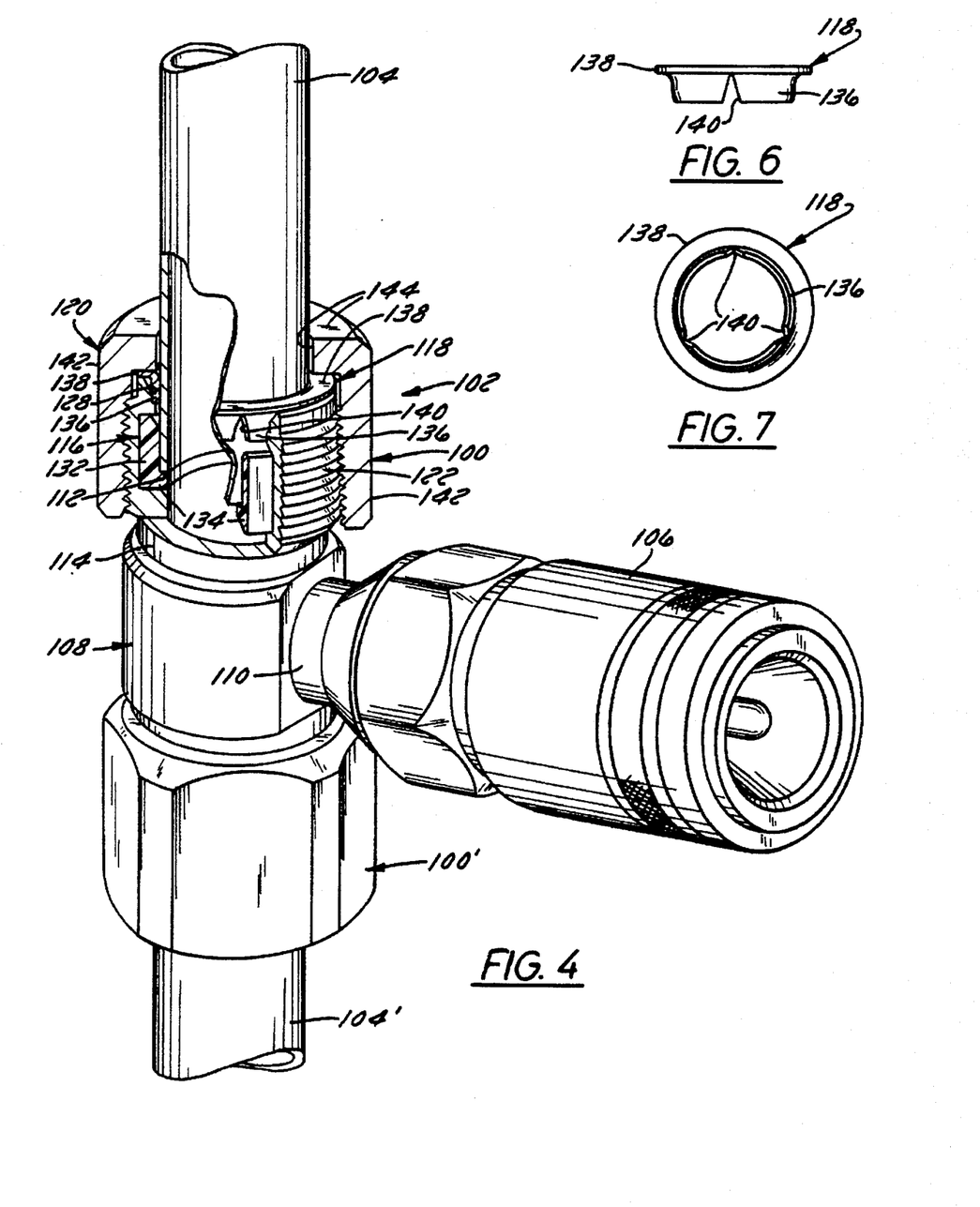
FIG. 4 is a partially cut away perspective view of a portion of a piping or tubing system employing fittings constructed in accordance with a preferred embodiment of the present invention.
FIG. 6 is an elevation view of the gripping ring of one of the fittings of FIGS. 4 and 5.
FIG. 7 is an inner plan view of the gripping ring of FIG. 6.
Figure 5:
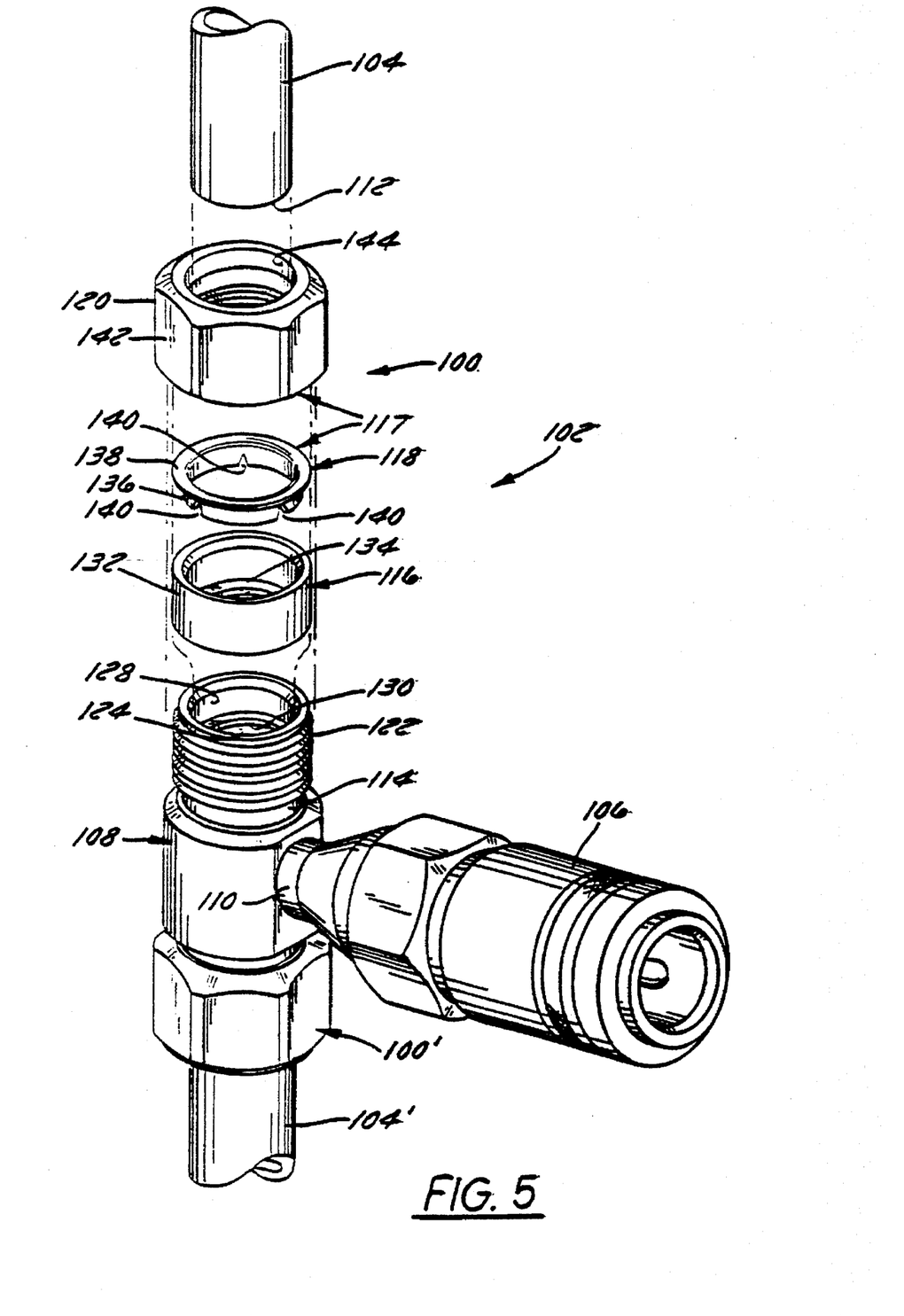
FIG. 5 is a perspective view of the piping system portion of FIG. 4, illustrating one of the fittings in an exploded perspective form.
Figure 8:
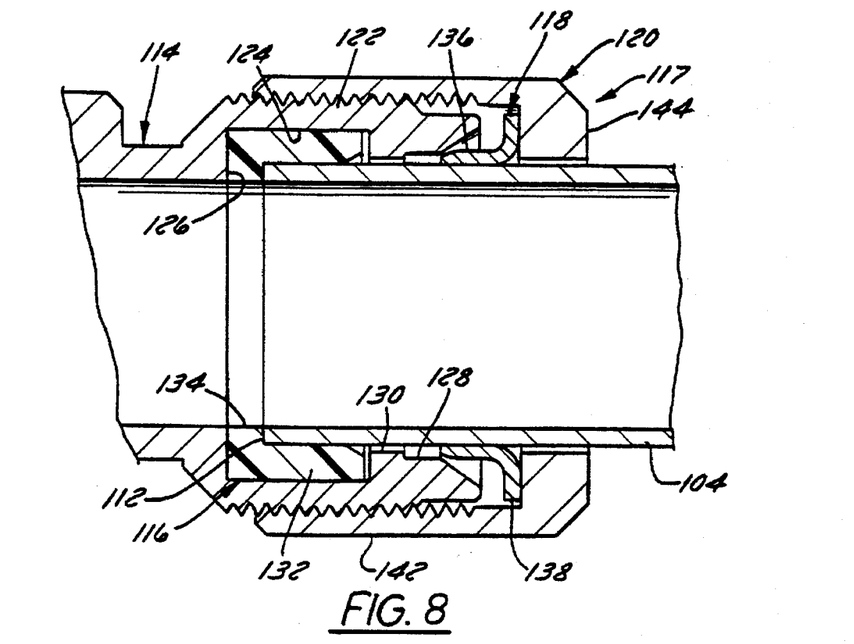
FIG. 8 is a sectional elevation view of one of the fittings of FIGS. 4 and 5 and of the associated end portion of the adjacent tube, illustrating the fitting in an intermediate stage of assembly.
Figure 9:
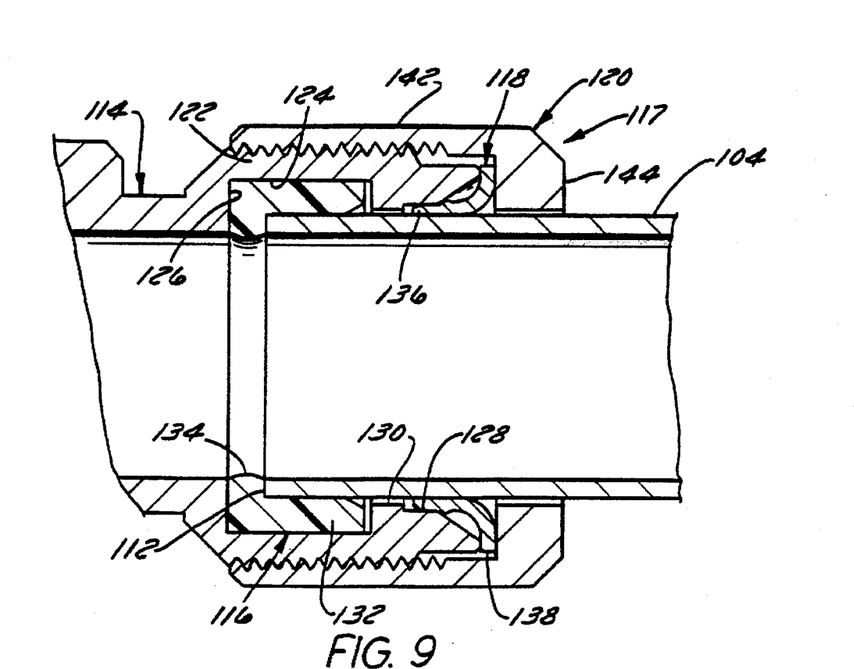
FIG. 9 corresponds to FIG. 8 and illustrates the fitting in a complete stage of assembly.

The ferrule or gripping ring 118 is designed to firmly grip the tube 104 and, upon tightening of the nut 120, to draw the tube 104 into the position illustrated in FIG. 9 in which the end 112 of tube 104 seals against the flange 134 on the elastomeric seal 116 without excessively deforming the seal 116. Referring particularly to FIGS. 6 and 7, the gripping ring 118 is formed from stamped stainless steel and includes a generally cylindrical portion 136 and an annular flange 138. The generally cylindrical portion 136 is disposed in the stepped notch 128 in the body 114 when the fitting 100 is in its assembled position illustrated in FIGS. 4 and 9 and functions to grip the tube 104 and draw its end 112 into sealing engagement with the seal 116. The annular flange 138 extends generally radially outwardly from the generally cylindrical portion 136 so as to engage the outer axial end surface of the body 114 when the fitting 100 is in its assembled condition. Referring again to FIGS. 6 and 7, a plurality (three in the illustrated embodiment) of generally V-shaped notches 140 are formed in the generally cylindrical portion 136 so as to extend from the inner axial end thereof towards the outer axial end thereof. The combined cross-sectional area of these notches 140 is smaller, indeed much smaller, than the combined cross sectional area of the remainder of the generally cylindrical portion 136. The notches 140 only need be large enough to permit the generally cylindrical portion 136 to deflect into gripping engagement with the outer peripheral surface of the tube 104. In many other similar devices, on the other hand, much larger notches are cut out to provide gripping fingers. In addition, the generally cylindrical portion 136 engages the outer radial peripheral surface of the tube 104 along substantially the entire length thereof. Accordingly, the gripping ring 118 presents a gripping area which is dramatically larger than gripping areas presented by other gripping rings of this general type. The gripping ring 118 accordingly acts like a collet in a lathe in that it imposes relatively high gripping forces on the tube 104, and the fitting 100 therefore can withstand significantly higher pressures than comparative prior art fittings. Indeed, while most commercial compression fittings which are currently available fail at pressures on the order of 250–500 psi, the inventive fitting 100 has withstood pressures in excess of 3,000 psi and can withstand pressures in excess of 2,000–2,500 psi for extended periods of time.

The nut 120 is a standard hex nut generally used in compression fittings. The nut has a tubular body 142 which is threaded on its inner radial peripheral surface. A flange 144 is formed on the outer axial end of the body 142 and extends generally radially inwardly from the body 142. The threaded inner radial peripheral surface of the flange 142 engages the threaded outer radial peripheral surface of the body 114. An inner axial surface of the radial flange 144 engages the outer axial surface of the annular flange 138 on the gripping ring 118.

3. Assembly And Operation Of Fitting

Assembly of the fitting 100 is a relatively simple task. First, the tube 104 is provided. Its end 112 can be cut in a standard fashion and need not be excessively smooth. The seal 116 is placed in the recess 124 in the body 114, either by the user or by the manufacturer. The gripping ring 118 and hex nut 120 are then slid over the end 112 of the tube 104 such that the threads of the hex nut 120 face the threads on the body 114 and such that the generally cylindrical portion 136 of the gripping ring 118 faces the body 114. The tube 104 is free to slide axially with respect to the gripping ring 118 at this time because there is a slight clearance between the cylindrical portion 136 of the gripping ring 118 and the outer peripheral surface of the tube 104. The assembler therefore can slide the tube 104 into a position in which the end 112 of the tube 104 engages the seal flange 134. The outer peripheral surface of the tube 104 forms an interference fit with the inner peripheral surface of the axial leg 132 of the seal 116 at this time, thereby to form a fluid-tight seal.

The nut 120 is then threaded onto the body 114 to draw the gripping ring 118 further into the stepped notch 128 in the body 114. The gripping ring 118 moves axially with respect to the tube 104 until the outer end of the cylindrical portion 136 of the gripping ring 118 travels into the reduced diameter portion of the stepped notch 128 a sufficient distance to deflect into gripping engagement with the outer peripheral surface of the tube 104. The body 114, seal flange 134, stepped notch 128 in the body 114, and gripping ring 118 are dimensioned and configured such that threading the nut 120 further onto the body 114 draws the gripping ring 118 and the tube 104 to the position illustrated in FIG. 9 in which the radial flange 138 of the gripping ring 118 engages the outer axial end of the body 114 and in which the axial end 112 of the tube 104 compresses the flange 134 on the seal 116 sufficiently to assure a sealing engagement between it and the shoulder 126 of the body 114 and between it and the end 112 of the tube 104 without excessively deforming the seal 116 (the tube 104 moves about 0.010" during this motion). Accordingly, the above-described generally contiguous surface is formed along the inner peripheries of the body 114, seal flange 134, and tube 104 while simultaneously assuring that no crevices or voids are formed in the vicinity of the seal 116. Fluid accumulation and bacterial or other microbe growth which could otherwise occur are therefore avoided.

It can thus be seen that the inventive fitting 100 provides a remarkably simple and effective mechanism for providing a sanitary coupling between a tube 104 of a tubing or piping system 102 and other tubes and/or other components of the system. The design of the fitting 100 is flexible, being suitable for use with tubing or piping systems varying greatly in size, and is extremely strong, capable of withstanding pressures up to ten times higher then the failure pressure of comparable prior art fittings.

Many changes and modifications, other than those discussed above, could be made to the disclosed fitting 100 without departing from the spirit of the present invention. For instance, the illustrated hex nut 120 of the locking mechanism 117 could be replaced by clamps or other devices capable of drawing the tube 104 and the gripping ring 118 or a comparable gripping device into the required location and subsequently retaining them in place. Moreover, the body 114, seal 116, and gripping ring 118 could all take different configurations so long as the primary goals of the invention are met. The scope of these and other changes will become apparent from the appended claims.

I claim:

1. A sanitary fitting for a tube having an inner radial peripheral surface, an outer radial peripheral surface, and an axial end, said sanitary firing comprising:

(A) a tubular body having an outer axial end portion, said end portion having an inner radial peripheral surface which has a recess formed therein, said recess having an outer radial wall and first and second axial end walls extending radially inwardly from said outer radial wall, said first axial end wall presenting an annular shoulder;

(B) an L-shaped tubular elastomeric seal which is disposed in said recess in said end portion of said body and which has an inwardly-projecting annular flange, said flange having inner and outer axial surfaces and having an inner radial peripheral surface, said inner axial surface of said flange sealingly engaging said shoulder of said body and said outer axial surface of said flange being sealingly engageable with said axial end of said tube, said flange extending radially inwardly a sufficient distance and abutting against said shoulder and said axial end of said tube so as to completely eliminate crevices between said flange, said shoulder, and said axial end of said tube where fluids may accumulate; and (C) a locking mechanism which includes (1) a gripping device which surrounds said tube, wherein said gripping device grips said outer radial peripheral surface of said tube and draws said axial end of said tube into sealing engagement with said outer axial surface of said annular flange of said seal; and (2) a retaining device which surrounds said tube, said gripping device, and said body and which locks said tube, said gripping device, and said body in position.

2. A fitting as defined in claim 1, wherein said body and said seal are dimensioned and configured such that said inner radial peripheral surface of said body, said inner radial peripheral surface of said flange of said seal, and said inner radial peripheral surface of said tube present a generally contiguous cylindrical surface.

3. A fitting as defined in claim 1, wherein said gripping device includes a gripping ring, said gripping ring having
   a generally cylindrical portion which is disposed radially between said body and said tube and which grips said tube and draws said tube into sealing engagement with said outer axial surface of said annular flange of said seal, said generally cylindrical portion a) having inner and outer axial ends, b) having a plurality of notches formed therein which extend from said inner axial end toward said outer axial end, and c) engaging said outer radial peripheral surface of said tube along substantially the entire axial length of said generally cylindrical portion, and
   an annular flange extending generally radially outwardly from said generally cylindrical portion, said annular flange having an inner axial end surface which engages said body.

4. A fitting as defined in claim 3, wherein said notches in said generally cylindrical portion of said gripping ring have a combined surface area which is relatively small when compared to a surface area of the remainder of said generally cylindrical portion.

5. A fitting as defined in claim 3, wherein said body has a threaded outer radial peripheral surface, and wherein said retaining device comprises a nut having a threaded inner radial peripheral surface and having an inwardly-projecting radial flange formed on an outer axial end thereof, said radial flange engaging an outer axial surface of said annular flange of said retaining ring.

6. A fitting as defined in claim 3, wherein
   said end portion of said body has a stepped notch formed in an outer axial end of said inner radial peripheral surface thereof,
   said stepped notch is wider in cross-section in an axial outer end portion thereof than in an axial inner end portion thereof, and wherein
   said stepped notch receives said generally cylindrical portion of said gripping ring.

7. A sanitary fitting for a tube having an inner radial peripheral surface, an outer radial peripheral surface, and an axial end, said sanitary fitting comprising:
   (A) a tubular body having an outer axial end portion, said end portion having an inner radial peripheral surface which has a recess formed therein to present an annular shoulder;
   (B) an L-shaped tubular elastomeric seal which is disposed in said recess in said end portion of said body and which has an inwardly-projecting annular flange, said flange having inner and outer axial surfaces and having an inner radial peripheral surface, said inner axial surface of said flange sealingly engaging said shoulder of said body and said outer axial surface of said flange being sealingly engageable with said axial end of said tube; and
   (C) a locking mechanism which includes
      (1) a gripping device which surrounds said tube, wherein said gripping device grips said outer radial peripheral surface of said tube and draws said axial end of said tube into sealing engagement with said outer axial surface of said annular flange of said seal, wherein said gripping device includes a gripping ring, said gripping ring having a generally cylindrical portion which is disposed radially between said body and said tube and which grips said tube and draws said tube into sealing engagement with said outer axial surface of said annular flange of said seal, said generally cylindrical portion a) having inner and outer axial ends, b) having a plurality of notches formed therein which extend from said inner axial end toward said outer axial end, and c) engaging said outer radial peripheral surface of said tube along substantially the entire axial length of said generally cylindrical portion, and an annular flange extending generally radially outwardly from said generally cylindrical portion, said annular flange having an inner axial end surface which engages said body, wherein
         said end portion of said body has a stepped notch formed in an outer axial end of said inner radial peripheral surface thereof, wherein said stepped notch is wider in cross-section in an axial outer end portion thereof than in an axial inner end portion thereof, and
         said stepped notch receives said generally cylindrical portion of said gripping ring, and wherein
         said end portion of said body has an inwardly projecting radial flange formed thereon which defines an outer axial end of said recess and which defines an inner axial end of said stepped notch; and
      (2) a retaining device which surrounds said robe, said gripping device, and said body and which locks said tube, said gripping device, and said body in position.

8. A sanitary fitting for a tube having an inner radial peripheral surface, an outer radial peripheral surface, and an axial end, said sanitary fitting comprising:
   (A) a tubular body having an outer axial end portion, an inner annular shoulder being formed adjacent an inner axial end of said outer axial end portion;
   (B) an elastomeric seal having an outer axial surface and an inner axial surface, said inner axial surface sealingly engaging said shoulder of said body and said outer axial surface being sealingly engageable with said axial end of said tube; and
   (C) a locking mechanism which includes
      (1) a gripping ring which grips said outer radial peripheral surface of said tube and which draws said tube into sealing engagement with said outer axial surface of said seal, said gripping ring having a generally cylindrical portion which is disposed radially between said body and said tube and which grips said outer radial peripheral surface of said tube and draws said tube into sealing engagement with said outer axial surface of said seal, said generally cylindrical portion
         (a) having inner and outer axial ends,
         (b) having a plurality of notches formed therein which extend from said inner axial end toward said outer axial end thereof, wherein said notches have a combined surface area which is relatively small when compared to a surface area of the remainder of said generally cylindrical portion, and
         (c) engaging said outer radial peripheral surface of said tube along substantially the entire axial length of said generally cylindrical portion; and
      (2) a retaining device which surrounds said tube, said gripping ring, and said body and which locks said tube, said gripping ring, and said body in position, wherein a recess is formed in said inner radial peripheral surface of said end portion of said body, an inner axial end of said recess presenting said annular shoulder, said seal is L-shaped and is disposed in said recess in said body, and wherein said seal has an inwardly-projecting annular flange which presents said inner and outer axial end surfaces of said seal and which has an inner radial peripheral surface, said outer axial end portion of said body has a stepped notch formed in an outer axial end of said inner radial peripheral surface thereof, wherein said stepped notch is wider in cross-section in an axial outer end portion thereof than in an axial inner end portion thereof, and wherein said stepped notch receives said generally cylindrical portion of said gripping ring, and wherein said outer axial end portion of said body has an inwardly projecting radial flange formed thereon which defines an outer axial end of said recess and which defines an inner axial end of said stepped notch.

9. A fitting as defined in claim 8, wherein said body and said seal are dimensioned and configured such that said inner radial peripheral surface of said body, said inner radial peripheral surface of said seal, and said inner radial peripheral surface of said tube present a generally contiguous cylindrical surface lacking any crevices where fluids may accumulate.

10. A fitting as defined in claim 8, wherein said gripping ring further comprises an annular flange extending generally radially outwardly from said outer axial end of said generally cylindrical portion, said annular flange having an inner axial surface which engages said body.

11. A fitting as defined in claim 10, wherein said body has a threaded outer radial peripheral surface, and wherein said retaining device comprises a nut having a threaded inner radial peripheral surface and having a radial flange formed on an outer axial end thereof, said radial flange engaging an outer axial surface of said annular flange of said gripping ring.

12. A method comprising:
(A) providing
  (1) a tubular body comprising an outer axial end portion, an outer radial peripheral surface of said end portion being threaded and an inner radial peripheral surface of said end portion presenting an annular shoulder;
  (2) a generally L-shaped elastomeric seal which includes (a) a cylindrical portion which surrounds said tube and which has an inner axial end and an outer axial end and (b) an annular flange which projects radially inwardly from said inner axial end of said cylindrical portion and which presents an outer axial surface and an inner axial surface, and
  (3) a metal tube having an axial end;
(B) sliding a gripping ring and a nut over said axial end of said tube, said nut having a threaded inner radial peripheral surface;
(C) positioning said tube, said gripping ring, and said nut such that said axial end of said tube and at least a portion of said gripping ring are surrounded by said outer axial end portion of said body and such that said nut engages said body and said axial end of said tube engages said outer axial surface of said annular flange of said seal; then (D) threading said nut onto said body such that said nut moves axially with respect to said body and forces said gripping ring to move axially with respect to said body; and (E) gripping said tube with said gripping ring such that, during at least a portion of said step (D), said gripping ring draws said tube into a position in which said annular flange of said seal is clamped and slightly compressed between said axial end of said tube and said annular shoulder of said body and in which said inner axial surface of said annular flange of said seal sealingly engages said shoulder of said body and said outer axial surface of said annular flange of said seal sealingly engages said axial end of said tube so as to completely eliminate crevices between said flange, said shoulder, and said axial end of said tube, wherein, following said steps (D) and (E), a space exists axially beyond said outer axial end of said cylindrical portion of said seal and said cylindrical portion remains uncompressed.

13. A method as defined in claim 12, wherein said step of gripping said tube comprises engaging said outer radial peripheral surface of said tube with a generally cylindrical portion of said gripping ring as said generally cylindrical portion slides through a stepped notch formed in said inner radial peripheral surface of said body.

14. A method as defined in claim 13, wherein notches are formed in said generally cylindrical portion of said gripping ring and have a combined surface area which is relatively small when compared to a surface area of the remainder of said generally cylindrical portion, and wherein said gripping step comprises engaging said outer radial peripheral surface of said tube along substantially the entire axial length of said generally cylindrical portion, said gripping step being facilitated and enhanced by said notches in said generally cylindrical portion.

15. A method as defined in claim 12, wherein, during said step (E), said outer radial peripheral surface of said metal tube sealingly engages said cylindrical portion of said seal.

16. A method as defined in claim 12, further comprising pressurizing said metal tube to at least 2,000 psi.

17. A sanitary fitting for a tube having an inner radial peripheral surface, an outer radial peripheral surface, and an axial end, said sanitary fitting comprising:
(A) a tubular body having an axial end portion, said end portion having an inner radial peripheral surface and a threaded outer radial peripheral surface, wherein
  (1) a recess is formed in said inner radial peripheral surface of said end portion of said body, an inner axial end of said recess presenting an annular shoulder,
  (2) a stepped notch is formed in an outer axial end of said inner radial peripheral surface of said end portion of said body, said stepped notch being wider in cross-section in an axial outer end portion thereof than in an axial inner end portion thereof,
  (3) a radial flange projects inwardly from said inner radial peripheral surface of said body and defines an outer axial end of said recess and an inner axial end of said stepped notch;
(B) an L-shaped tubular elastomeric seal which is disposed in said recess in said body and which has an inwardly-projecting annular flange, said flange
  (1) being of generally rectangular cross-section along substantially its entire length,
  (2) having inner and outer axial surfaces, said inner axial surface of said flange sealingly engaging said shoulder of said body and said outer axial surface of said flange being sealingly engageable with said axial end of said tube, and (3) having an inner radial peripheral surface;

(C) a gripping ring which engages said outer radial peripheral surface of said tube and which draws said tube into sealing engagement with said outer axial surface of said annular flange of said seal, said gripping ring having (1) a generally cylindrical portion which is disposed in said stepped notch in said body and which grips said tube and draws said tube into sealing engagement with said outer axial surface of said annular flange of said seal, said generally cylindrical portion (a) having inner and outer axial ends, (b) having a plurality of notches formed therein which extend from said inner axial end toward said outer axial end, wherein said notches in said generally cylindrical portion have a combined surface area which is relatively small when compared to a surface area of the remainder of said generally cylindrical portion, and (c) engaging said outer radial peripheral surface of said tube along substantially the entire axial length of said generally cylindrical portion, and (2) an annular flange extending generally radially outwardly from said generally cylindrical portion, said annular flange having an inner axial surface which engages said body; and (D) a nut having a threaded inner radial peripheral surface and having a radial flange formed on an outer axial end thereof, said inner radial peripheral surface of said nut threadedly engaging said threaded outer radial peripheral surface of said body, said radial flange of said nut engaging said outer axial surface of said annular flange of said gripping ring.

18. A fitting as defined in claim 1, wherein said seal further comprises a cylindrical portion which surrounds said tube and which has an inner axial end and an outer axial end, wherein said annular flange projects radially inwardly from said inner axial end of said cylindrical portion, wherein said recess in said body has an axial length which is longer than an axial length of said cylindrical portion, and wherein a space exists between said outer axial end of said cylindrical portion and said second axial end wall such that said cylindrical portion remains axially uncompressed upon fitting assembly.

19. A fitting as defined in claim 18, wherein said end portion of said body has an inwardly projecting radial flange formed thereon which defines an outer axial end of said recess, said inwardly projecting radial flange of said end portion of said body defining an inner axial end of a stepped notch in which said gripping device is disposed.

20. A fitting as defined in claim 1, wherein said gripping device comprises a gripping ring having a generally cylindrical portion which is disposed radially between said body and said tube and which grips said outer radial peripheral surface of said tube and draws said tube into sealing engagement with said outer axial surface of said seal, wherein a substantial lower portion of said generally cylindrical portion is positioned within a bottom portion of a stepped notch formed in said body, said bottom portion of said stepped notch and said substantial lower portion of said generally cylindrical portion extending generally in parallel with a central longitudinal axis of said tube.

* * * * *